United States Patent
Wen et al.

(10) Patent No.: US 8,752,251 B2
(45) Date of Patent: Jun. 17, 2014

(54) CORD RELEASE OF WINDOW COVERING

(75) Inventors: Yu-Che Wen, Guishan Township (TW); Chih-Yao Chang, Taichung (TW)

(73) Assignee: Nien Made Enterprise Co., Ltd., Taichung (TW)

(*) Notice: Subject to any disclaimer, the term of this patent is extended or adjusted under 35 U.S.C. 154(b) by 89 days.

(21) Appl. No.: 13/404,306

(22) Filed: Feb. 24, 2012

(65) Prior Publication Data
US 2013/0111709 A1  May 9, 2013

(30) Foreign Application Priority Data
Nov. 4, 2011  (TW) .............................. 100220947 U (51) Int. Cl.
*F16G 11/00* (2006.01)
*E06B 9/326* (2006.01)

(52) U.S. Cl.
USPC ............... 24/115 F; 160/178.1 R; 160/178.2; 24/115 R (58) Field of Classification Search
USPC .............. 24/115 F, 115 R, 129 R, 128, 715.4, 24/715.6, 602; 160/428, 178.1 R, 173 R
See application file for complete search history.

(56) References Cited

U.S. PATENT DOCUMENTS

| | | | | |
|---|---|---|---|---|
| 5,560,414 A | * | 10/1996 | Judkins et al. | 160/178.1 R |
| 5,562,140 A | * | 10/1996 | Biba | 160/178.1 R |
| 2012/0266416 A1 | * | 10/2012 | Lee | 24/115 F |
| 2013/0007990 A1 | * | 1/2013 | Wen et al. | 24/115 R |

* cited by examiner

*Primary Examiner* — Robert J Sandy
(74) *Attorney, Agent, or Firm* — Tracy M. Heims; Apex Juris, pllc (57) ABSTRACT

A cord release for a window covering includes at least two cases engaged together to form a barrel with an opening at a top thereof. The cord release is defined with a frontal plane and a sagittal plane. A left side and a right side are defined at opposite sides of the sagittal plane, and a front side and a back side are defined at opposite sides of the frontal plane. The opening has a first collecting portion at the front side of the frontal plane and the right side of the sagittal plane, and a second collecting portion at the back side of the frontal plane and the left side of the sagittal plane. Therefore, the cords will be led to the first collecting portion and the second collecting portion to disengage the cases by the struggle force.

15 Claims, 6 Drawing Sheets

CORD RELEASE OF WINDOW COVERING

BACKGROUND OF THE INVENTION

1. Field of the Invention

The present invention relates generally to a window covering, and more particularly to a cord release of a window covering.

2. Description of the Related Art

Figure 1:
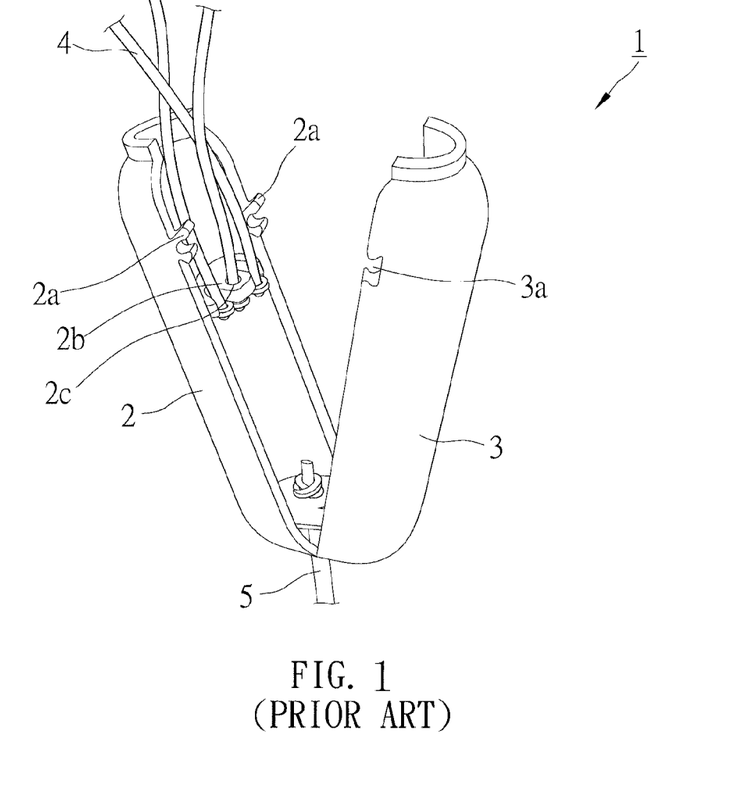
FIG. 1 is a perspective view of the conventional cord release.
Figure 2:
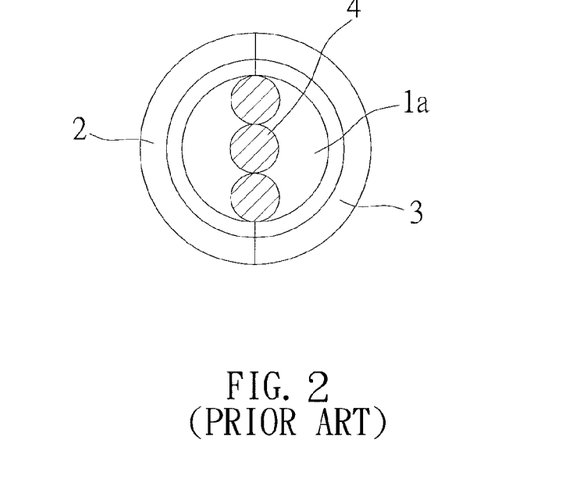
FIG. 2 is a top view of the conventional cord release.

FIG. 1 and FIG. 2 show a conventional cord release 1 for a window covering to connect a plurality of cords 4 and a rope 5. The cord release 1 thus can collect the cords together and at the same time user may operate the rope 5 to raise or lower the window covering.

The cord release 1 includes two semi-circular cases 2 and 3 with their bottoms connected together. The case 2 has a pair of blocks 2a to engage slots 3a on the case 3. The cord release 1 has a round opening 1a on a top thereof when the cases 2 and 3 are engaged. The cords 4 enter the cord release 1 through the opening 1a, and some of the cords 4 are fastened with a rib 2b on an inner side of the case 2, and the rest cord 4 passes through a hole 2c and ties a knot so that the cords 4 are connected to the cord release 1.

Kids may play with the cords and be strangled by the cords 4. When the kid struggles, it may disengage the case 2 away with case 3 of the cord release 1 that he/she may escape from the cords 4. However, when the kid struggles, the cords may be forced to push against the round opening 1a. But since the opening 1a is round, the force can't concentrate at the exact location at the opening 1a to disengage the cases 2 and 3. The best location that the cords shall push against the opening 1a so as to disengage the cases 2 and 3 is perpendicular to the junction plane of the cases 2 and 3 when they are engaged together. Any delay in disengagement may increase the danger or hurt to the strangled kid.

Besides, even when the cases 2 and 3 are disengaged, since some of the cords 4 are tied together with case 2, the cords 4 may still remain in the hole 2c and entangled with other cords 4 to strangle the kid.

SUMMARY OF THE INVENTION

The primary objective of the present invention is to provide a cord release of a window covering, which may guide the cords to disengage the cases when the kid is strangled between the cords.

According to the objective of the present invention, a cord release for a window covering includes a plurality of cases engaged together to form a barrel with an opening at a top thereof that a plurality of cords enter the barrel through the opening. The cord release is defined with a frontal plane, which is parallel to butt connecting edges of the cases, and a sagittal plane, which is perpendicular to the frontal plane. The sagittal plane and the frontal plane cross at a center of the cord release. A left side and a right side are defined at opposite sides of the sagittal plane, and a front side and a back side are defined at opposite sides of the frontal plane. The opening has a first collecting portion at the front side of the frontal plane and the right side of the sagittal plane, and a second collecting portion at the back side of the frontal plane and the left side of the sagittal plane.

In an embodiment, on an edge of the opening has a first guiding section having a start at the left side of the sagittal plane and an end connecting to the first collecting portion, and a second guiding section having a start at the right side of the sagittal plane and an end connecting to the second collecting portion.

In an embodiment, the start of the first guiding section is at the back side of the frontal plane, and the start of the second guiding section is at the front side of the frontal plane.

In an embodiment, on the edge of the opening further has a third guiding section having a start connecting to the start of the second guiding section and an end connecting to the first collecting portion, and a fourth guiding section having a start connecting to the start of the first guiding section and an end connecting to the second collecting portion.

In an embodiment, the third guiding section is shorter than the first guiding section, and the fourth guiding section is shorter than the second guiding section.

In an embodiment, the case is provided with at least a cord fastener on an inner side thereof, which has an elongated cord slot parallel to the sagittal plane.

In an embodiment, the case is provided with two walls on the inner side thereof to form a tunnel therebetween, and the tunnel communicates the opening with the cord slot.

In an embodiment, the case is provided with a first bore and a second bore at a bottom thereof, and the other case is provided with a third bore at a bottom thereof that a rope passes through the first bore, the third bore, and the second bore in sequence.

The present invention further provides a cord release for a window covering, including a plurality of cases engaged together to form a barrel with an opening at a top thereof that a plurality of cords enter the barrel through the opening. The cord release is defined with a frontal plane, which is parallel to butt connecting edges of the cases, and a sagittal plane, which is perpendicular to the frontal plane. The sagittal plane and the frontal plane cross at a center of the cord release. A left side and a right side are defined at opposite sides of the sagittal plane, and a front side and a back side are defined at opposite sides of the frontal plane. The opening has a first collecting portion at the front side of the frontal plane and a second collecting portion at the back side of the frontal plane, and an angle between a line passing the first collecting portion and the second collecting portion and the sagittal plane is in a range between zero degree and ninety degrees.

In an embodiment, on an edge of the opening has a first guiding section starting at the left side of the sagittal plane and ending at the first collecting portion, and a second guiding section starting at the right side of the sagittal plane and ending at the second collecting portion.

In an embodiment, the first guiding section has a portion at the back side of the frontal plane, and the second guiding section has a portion at the front side of the frontal plane.

In an embodiment, on the edge of the opening further has a third guiding section having opposite ends connecting to the second guiding section and the first collecting portion, and a fourth guiding section having opposite ends connecting to the first guiding section and the second collecting portion.

In an embodiment, the third guiding section is shorter than the first guiding section, and the fourth guiding section is shorter than the second guiding section.

In an embodiment, the case is provided with at least a cord fastener on an inner side thereof, which has an elongated cord slot parallel to the sagittal plane.

In an embodiment, the case is provided with two walls on the inner side thereof to form a tunnel therebetween, and the tunnel communicates the opening with the cord slot.

In an embodiment, the case is provided with a first bore and a second bore at a bottom thereof, and the other case is provided with a third bore at a bottom thereof that a rope passes through the first bore, the third bore, and the second bore in sequence.

The present invention further provides a cord release for a window covering includes a plurality of cases engaged together to form a barrel with an opening at a top thereof that a plurality of cords enter the barrel through the opening. Each case has a recess to form the opening when the cases are engaged, and each recess has a collecting portion and two guiding sections. The guiding sections are formed on an edge of the recess and are located at opposite sides of the collecting portion to guide the cords to the collecting portion, and one of the guiding sections is shorter than the other.

The design of the opening may lead the cords respectively to the first and the second collecting portion to disengage the cases by the struggling force.

DETAILED DESCRIPTION OF THE INVENTION

Figure 3:
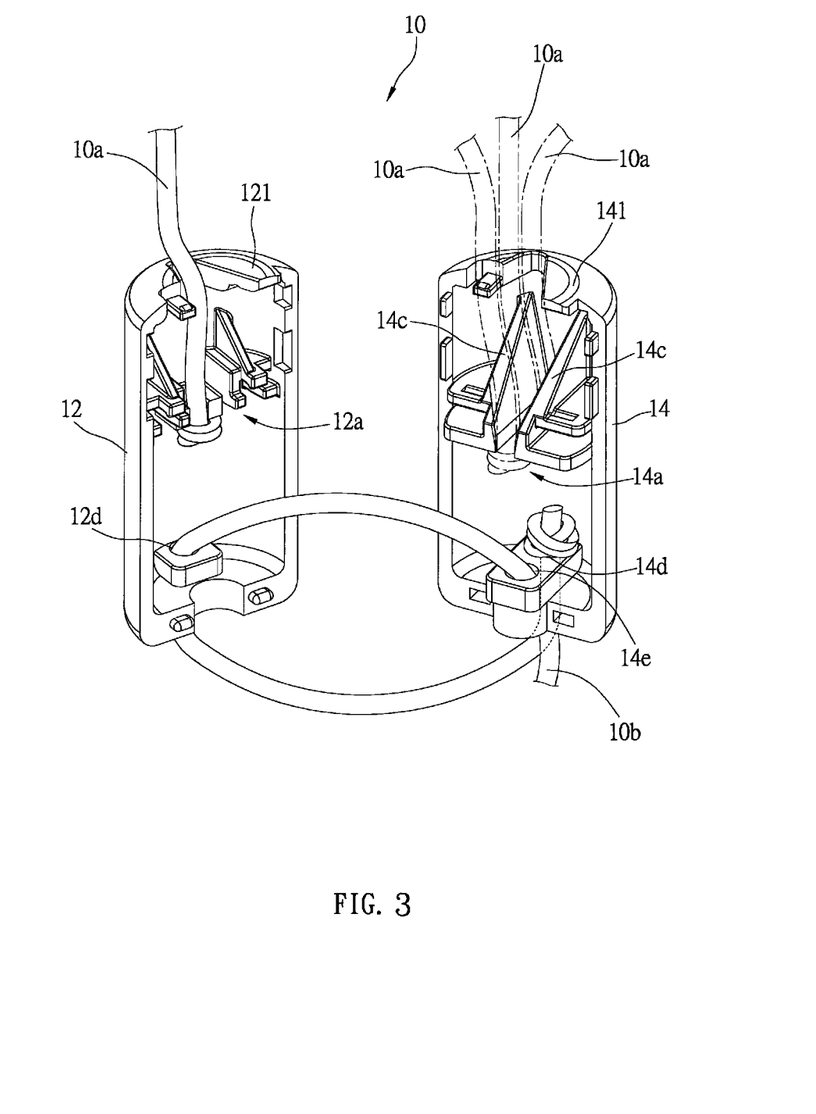
FIG. 3 is a perspective view of a preferred embodiment of the present invention in the disengaged condition.
Figure 4:
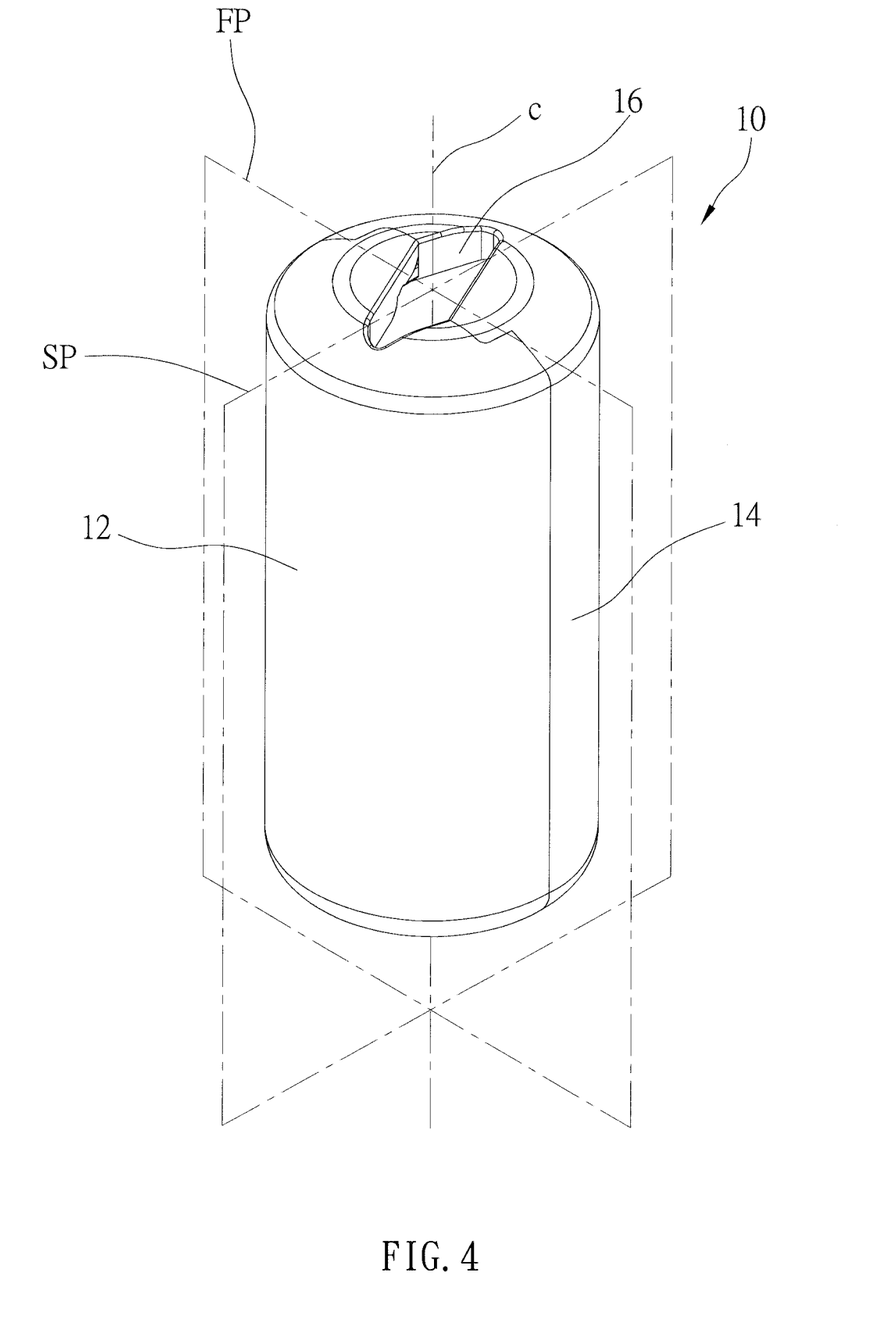
FIG. 4 is a perspective view of the preferred embodiment of the present invention in the engaged condition.

As shown in FIG. 3 and FIG. 4, a cord release 10 of the preferred embodiment of the present invention includes two cases 12 and 14 engaged together by several pairs of blocks and slots on the cases 12, 14 to form a barrel. The way of engaging and disengaging the cases 12, 14 is not the main character of the present invention, so we'll not describe in detail here.

Figure 6:
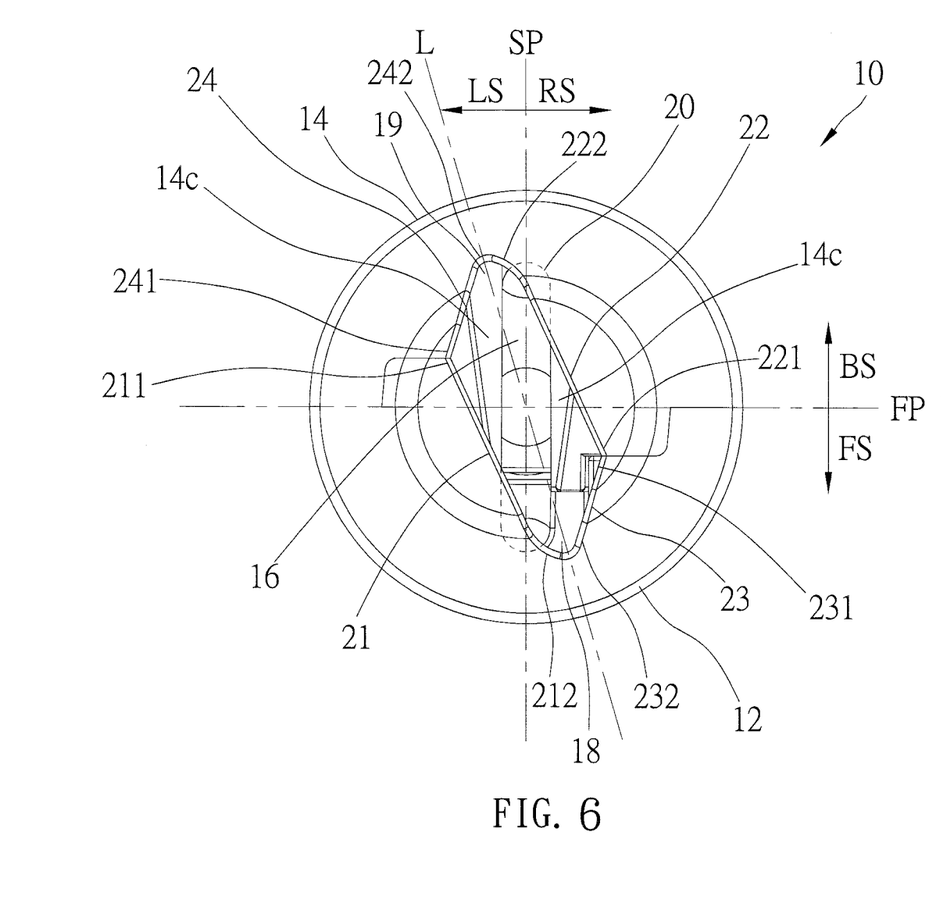
FIG. 6 is a top view of the preferred embodiment of the present invention.

As shown in FIG. 4, hereafter we define two planes on the cord release 10, including a frontal plane FP, which is parallel to butt connecting edges of the cases 12 and 14, and a sagittal plane SP, which is perpendicular to the frontal plane FP, and the sagittal plane SP and the frontal plane FP cross at a center C of the cord release 10. Opposite sides of the sagittal plane SP are defined as a left side LS and a right side RS, and opposite sides of the frontal plane FP are defined as a front side FS and a back side BS (as shown in FIG. 6).

In the present invention, the cases 12, 14 respectively are provided with a cord fastener 12a, 14a on an inner side thereof. The cord fastener 12a, 14a are complementary for engagement. The cases 12, 14 respectively have a recess on a top thereof to form an opening 16 when they are engaged.

The cord fasteners 12a, 14a respectively have a recess to form a cord slot 20 when they are engaged. The case 14 is provided with two parallel walls 14c on the inner side to form a tunnel therebetween. The tunnel communicates the opening 16 and the cord slot 20. A distance between the walls 14c is substantially identical to a width of the cord slot 20, and the width of the cord slot 20 is slightly greater or slightly less than a diameter of a cord 10a to hold the cord's knot. The cord slot 20 is parallel to the sagittal plane SP, and precisely, an elongated axis of the cord slot 20 is on the sagittal plane SP. The cords 10a enter the cord release 10 via the opening 16 and pass through the tunnel and the cord slot 20, and thereafter, the cords 10a are tied with knots to fasten the cords 10a to the cord release 10. The walls 14c and the cord slot 20 restrict the cords 10a to line in a direction parallel to the sagittal plane SP.

Figure 5:
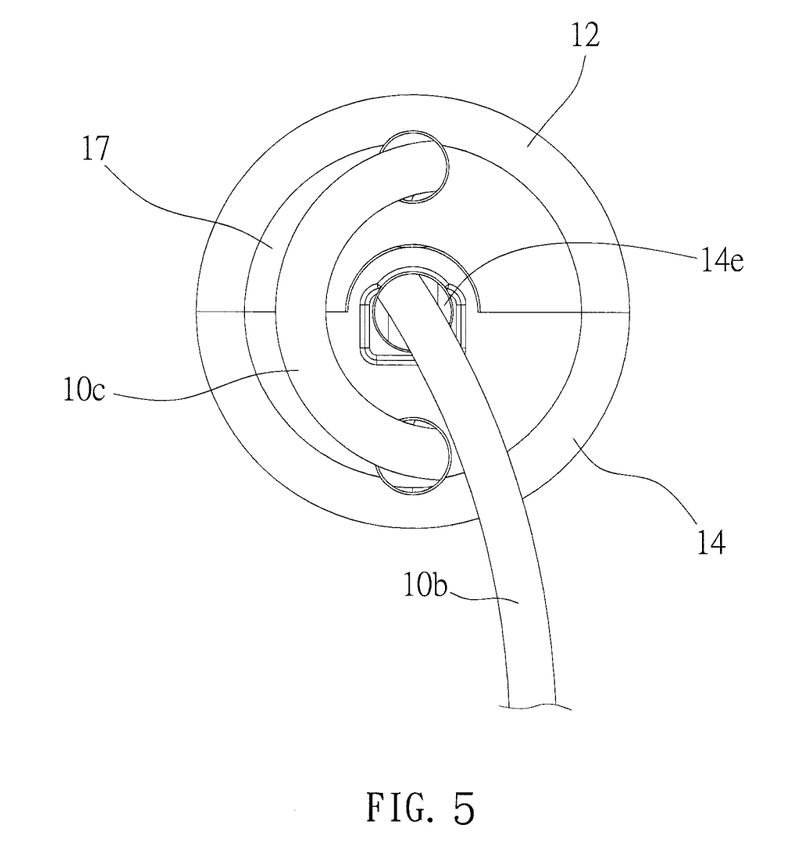
FIG. 5 is bottom view of the preferred embodiment of the present invention.

The case 14 has a first bore 14d and a second bore 14e on a bottom thereof, and the case 12 has a third bore 12d on a bottom. A rope 10b has a knot in one of its end. The unknotted end of the rope 10b passes through the first bore 14d from within the case 14 out toward the outside of the cord release 10 bottom, and then passes through the bore 12d upwardly, and downwardly through the second bore 14e in sequence out toward the bottom of the cord release 10, so to be used as the pulling rope 10b. As shown in FIG. 5, the barrel has a curved guiding slot 17, a half of which is on the case 12 and the other half of which is on the case 14, on a bottom thereof with opposite ends communicated with the first bore 14d and the third bore 12d to receive a section of the rope 10c between the first bore 14d and the third bore 12d so that the rope 10b will not get entangled with that section.

As shown in FIG. 6, the opening 16 on the top of the cord release 10 is substantial diamond. The widest portion of the opening 16 is at the frontal plane FP, and gradually narrows to the opposite sides to form a first collecting portion 18 and a second collecting portion 19 at the distal ends, wherein the first collecting portion 18 is at the front side FS of the frontal plane FP and the right side RS of the sagittal plane SP, and the second collecting portion 19 is at the back side BS of the frontal plane FP and the left side LS of the sagittal plane SP. A line L passing the first collecting portion 18 and the second collecting portion 19 is not parallel to the sagittal plane SP, and an angle therebetween is greater than or identical to 0 degree and less than or identical to ninety (90) degrees. On an edge of the opening 16 is defined with a first guiding section 21 and a second guiding section 22 at opposite sides. The first guiding section 21 and the second guiding section 22 are straight and are not parallel to the sagittal plane SP. The first guiding section 21 has a start 211 and an end 212, wherein the start 211 is at the back side BS of the frontal plane FP and the left side LS of the sagittal plane SP, and then the first guiding section 21 crosses the frontal plane FP and the sagittal plane SP to the end 212 at the front side FS of the frontal plane FP and right side RS of the sagittal plane SP, and the end 212 connects to the first collecting portion 18. Accordingly, the second guiding section 22 has a start 221 and an end 222, wherein the start 221 is at the front side FS of the frontal plane FP and the right side RS of the sagittal plane SP, and then the second guiding section 22 crosses the frontal plane FP and the sagittal plane SP to the end 222 at the back side BS of the frontal plane FP and left side LS of the sagittal plane SP, and the end 222 connects to the second collecting portion 19. As shown in FIG. 3, the cases 12 and 14 respectively have a plate 121, 141 to form the first guiding section 21 and the second guiding section 22.

The character of the present invention is that the first collecting portion 18 and the second collecting portion 19 are not on the sagittal plane SP, and they are at opposite sides of the sagittal plane SP. Consequently, the line L passing the first collecting portion 18 and the second collecting portion 19 would have an angle therebetween. We directly define this angle is an acute angle, however, if you see it from the opposite side, it would be an obtuse angle.

The opening 16 further has a third guiding section 23 and a fourth guiding section 24. The third guiding section 23 and the fourth guiding section 24 are straight and are respectively shorter than the first guiding section 21 and the second guiding section 22. The third guiding section 23 has a start 231 and an end 232, wherein the start 231 connects to the start 221 of the second guiding section 22 and the end 232 connects to the first collecting portion 18. Accordingly, the fourth guiding section 24 has a start 241 and an end 242, wherein the start 241 connects to the start 211 of the first guiding section 21 and the end 242 connects to the second collecting portion 19.

In practice, the opening 16 may be any shape except diamond, and the guiding sections 21-24 could be straight or curved. The first and the second guiding sections 21, 22 may be not parallel, and so are the third and the fourth guiding sections 23, 24.

Figure 7:
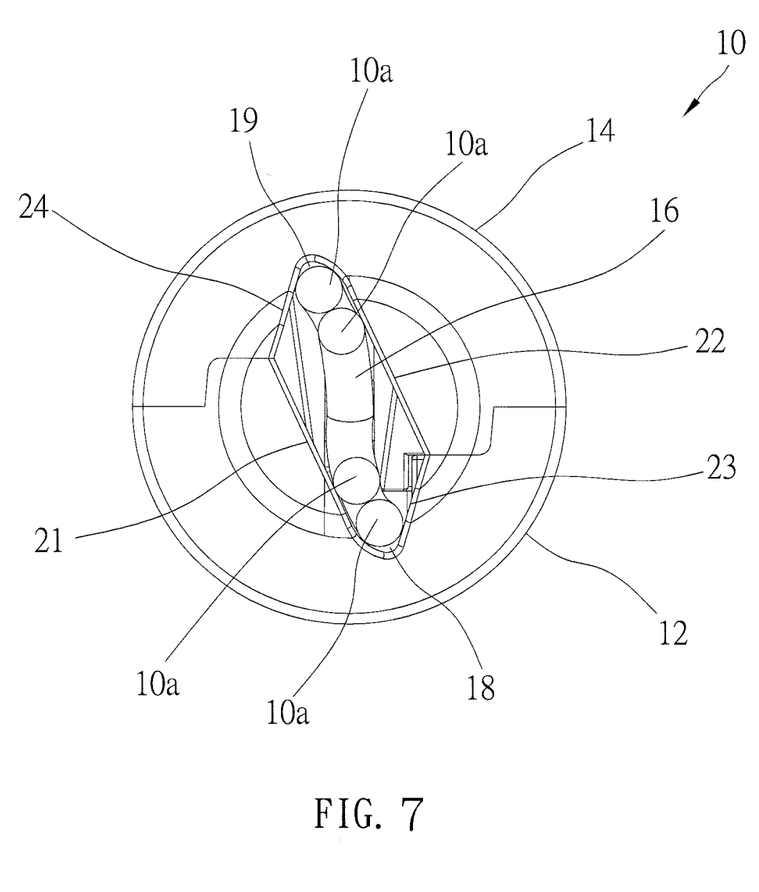
FIG. 7 is a top view of the preferred embodiment of the present invention, showing the cords going to opposite sides.

As shown in FIG. 7, when a kid plays with the cords 10a and is strangled by the cords 10a, the first and the third guiding portions 21, 23 will lead some cords 10a to the first collecting portion 18, and the second and the fourth guiding portions 22, 24 will lead the rest cords 10a to the second collecting portion 19. Because the first collecting portion 18 and the second collecting portion 19 diverge from the sagittal plane SP, it may disengage the cases 12, 14 easier. Consequently, when a kid plays with the cords 10a and is strangled by the cords 10a, his/her struggle will easily disengage the cases 12, 14 to make him/her can escape from the cords 12, 14.

The function of the walls 14c and the cord slot 20 is to restrict the cords 10a to line in a direction parallel to the sagittal plane SP. This will guide the cords 10a respectively to the front side FS and the back side BS to disengage the cases 12, 14.

The description above is only a few preferred embodiments of the present invention and the equivalence of the present invention is still in the scope of claim construction of the present invention.

What is claimed is:

1. A cord release for a window covering, comprising at least a first case and a second case that are engaged together to form a barrel with an opening at a top thereof that a plurality of cords enter the barrel through the opening, wherein the cord release is defined with a frontal plane, which is parallel to butt connecting edges of the cases, and a sagittal plane, which is perpendicular to the frontal plane, and the sagittal plane and the frontal plane cross at a center of the cord release, wherein a left side and a right side are defined at opposite sides of the sagittal plane, and a front side and a back side are defined at opposite sides of the frontal plane;
    wherein the opening has a first collecting portion at the front side of the frontal plane and the right side of the sagittal plane, and a second collecting portion at the back side of the frontal plane and the left side of the sagittal plane;
    wherein one of the cases is provided with a first bore and a second bore at a bottom thereof, and the other case is provided with a third bore at a bottom whereby a rope passes through the first bore, the third bore, and the second bore in sequence;
    wherein the barrel has a curved guiding slot on a bottom thereof to receive a section of the rope between the first bore and the third bore.

2. The cord release as defined in claim 1, wherein on an edge of the opening has a first guiding section having a start at the left side of the sagittal plane and an end connecting to the first collecting portion, and a second section having a start at the right side of the sagittal plane and an end connecting to the second collecting portion.

3. The cord release as defined in claim 2, wherein the start of the first guiding section is at the back side of the frontal plane, and the start of the second guiding section is at the front side of the frontal plane.

4. The cord release as defined in claim 2, wherein on the edge of the opening further has a third guiding section having a start connecting to the start of the second guiding section and an end connecting to the first collecting portion, and a fourth guiding section having a start connecting to the start of the first guiding section and an end connecting to the second collecting portion.

5. The cord release as defined in claim 4, wherein the third guiding section is shorter than the first guiding section, and the fourth guiding section is shorter than the second guiding section.

6. The cord release as defined in claim 1, wherein the barrel is provided with at least a cord fastener on an inner side thereof, which has an elongated cord slot parallel to the sagittal plane.

7. The cord release as defined in claim 6, wherein the barrel is provided with two walls on the inner side thereof to form a tunnel therebetween, and the tunnel communicates the opening with the cord slot.

8. A cord release for a window covering, comprising at least a first case and a second engaged together to form a barrel with an opening at a top thereof that a plurality of cords enter the barrel through the opening, wherein the cord release is defined with a frontal plane, which is parallel to connecting edges of the cases, and a sagittal plane, which is perpendicular to the frontal plane, and the sagittal plane and the frontal plane cross at a center of the cord release, further wherein a left side and a right side are defined at opposite sides of the sagittal plane, and a front side and a back side are defined at opposite sides of the frontal plane;
    wherein the opening has a first collecting portion at the front side of the frontal plane and a second collecting portion at the back side of the frontal plane;
    wherein an angle between a line passing the first collecting portion and the second collecting portion and the sagittal plane is in a range between zero degree and ninety degrees;
    wherein one of the cases is provided with a bore and a second bore at a bottom thereof, and the other case is provided with a third bore at a bottom thereof whereby a rope passes through the first bore, the third bore, and the second bore in sequence; and
    wherein the barrel has a curved guiding slot on a bottom thereof to receive a section of the rope between the first bore and third bore.

9. The cord release as defined in claim 8, wherein on an edge of the opening has a first guiding section starting at the left side of the sagittal plane and ending at the first collecting portion, and a second guiding section starting at the right side of the sagittal plane and ending at the second collecting portion.

10. The cord release as defined in claim 9, wherein the first guiding section has a portion at the back side of the frontal plane, and the second guiding section has a portion at the front side of the frontal plane.

11. The cord release as defined in claim 9, wherein on the edge of the opening further has a third guiding section having opposite ends connecting to the second guiding section and the first collecting portion, and a fourth guiding section having opposite ends connecting to the first guiding section and the second collecting portion.

12. The cord release as defined in claim 11, wherein the third guiding section is shorter than the first guiding section, and the fourth guiding section is shorter than the second guiding section.

13. The cord release as defined in claim 8, wherein the barrel is provided with at least a cord fastener on an inner side thereof, which has an elongated cord slot parallel to the sagittal plane.

14. The cord release as defined in claim 13, wherein the barrel is provided with two walls on the inner side thereof to form a tunnel therebetween, and the tunnel communicates the opening with the cord slot.

15. A cord release for a window covering, comprising a plurality of cases engaged together to form a barrel with an opening at a top thereof that a plurality of cords enter the barrel through the opening;

each of the cases having a recess to form the opening when the cases are engaged, and each of the recesses having a collecting portion and two guiding sections, wherein the guiding sections are formed on an edge of the recess and are located at opposite sides of the collecting portion to guide the cords to the collecting portion, and one of the guiding sections is shorter than the other;

wherein one of the cases is provided with a bore and a second bore at a bottom thereof, and the other case is provided with a third bore at a bottom thereof whereby a rope passes through the first bore, the third bore, and the second bore in sequence; and wherein the barrel has a curved guiding slot on a bottom thereof to receive a section of the rope between the first bore and third bore.

* * * * *